United States Patent
Kujawaski et al.

[11] Patent Number: 6,058,965
[45] Date of Patent: May 9, 2000

[54] LOW-TEMPERATURE FLOW-CONTROL VALVE

[75] Inventors: Bernd Kujawaski, Oberhausen; Peter Erich, Heiligenhaus, both of Germany; Jean-Claude Zapata, Montigny le Bretonneux, France

[73] Assignee: Flowserve Essen GmbH, Essen, Germany

[21] Appl. No.: 08/929,017

[22] Filed: Sep. 15, 1997

[30] Foreign Application Priority Data

Jun. 27, 1997 [DE] Germany ............................ 197 27 377

[51] Int. Cl.[7] .......................... F16K 27/02; F16K 27/10; B23K 20/12
[52] U.S. Cl. ............................. 137/315; 29/428; 29/700; 29/890.124; 29/890.131; 251/366; 251/368
[58] Field of Search .................. 137/15, 315; 29/890.12, 29/890.121, 890.124, 890.131, 401.1, 428, 700; 251/126, 366, 368, 122

[56] References Cited

U.S. PATENT DOCUMENTS

| | | | |
|---|---|---|---|
| 2,598,187 | 5/1952 | Meyer | 251/126 |
| 2,654,395 | 10/1953 | Kaye | 251/122 |
| 3,538,576 | 11/1970 | Saving | 251/368 |
| 4,061,157 | 12/1977 | Hanssen | 251/214 |
| 4,337,788 | 7/1982 | Seger | 137/454.6 |
| 4,452,427 | 6/1984 | Webb | 251/366 |
| 4,469,123 | 9/1984 | Merrill | 137/454.6 |
| 5,080,325 | 1/1992 | Dean, Jr. | 251/368 |

*Primary Examiner*—George L. Walton
*Attorney, Agent, or Firm*—Herbert Dubno; Andrew Wilford

[57] ABSTRACT

A flow-control valve has an outer housing assembly including an outer housing member, a tube fixed to the member and having an inner end remote from the member, and an end collar of high-alloy steel welded on the tube end. An inner housing member is formed of nonferrous metal with an inlet port and an outlet port and a valve seat between the ports. The end collar is seated in the inner housing member and a valve stem has an outer end at the outer housing member and an inner end projecting into the inner housing member and guided in the end collar, extending through the tube between the members, and carrying a valve body sealingly engageable with the seat. A connecting sleeve engaged around and fitted snugly to the end collar and inner member has an outer ring of high-alloy steel welded to the end collar and an inner ring of nonferrous metal, fixed integrally to the outer ring, and welded to the inner member.

3 Claims, 1 Drawing Sheet

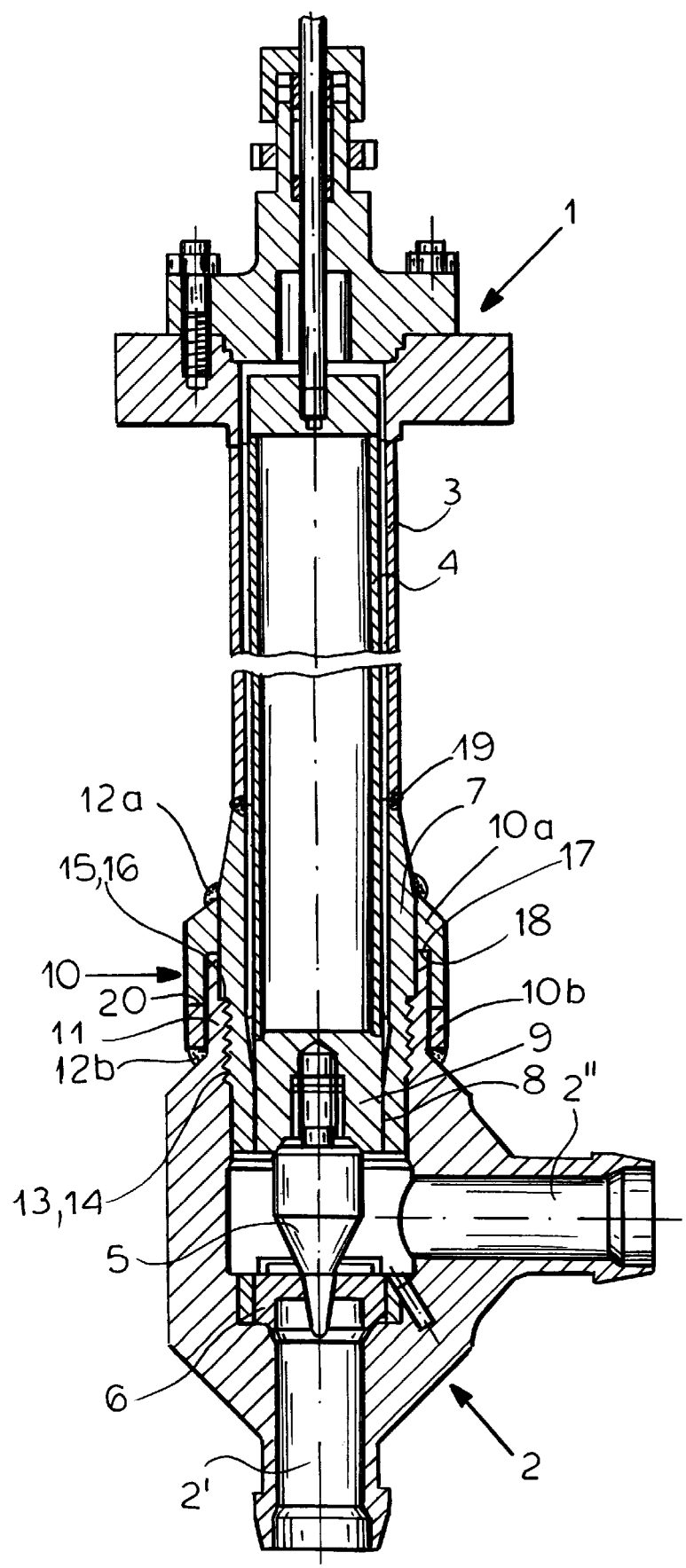

LOW-TEMPERATURE FLOW-CONTROL VALVE

FIELD OF THE INVENTION

The present invention relates to a valve. More particularly this invention concerns a low-temperature flowcontrol valve.

BACKGROUND OF THE INVENTION

A valve for controlling low-temperature fluids typically has an upper or outer housing assembly including an outer housing member, a tube fixed to the member and having an end remote from the member, and an end collar welded on the tube end and a lower or inner housing member formed of high-alloy steel with an inlet port and an outlet port and a valve seat between the ports. The end collar is seated in the inner housing member and a valve stem having an outer end at the outer housing member and an inner end projects into the inner housing member and is guided in the end collar, extends through the tube between the members, and carries a valve body sealingly engageable with the seat. A connector is engaged around and fitted snugly to the end collar to secure these two parts together. Normally at least the end collar is made of a high alloy steel, typically a chromium/nickel stainless steel, and the inner member is made of a nonferrous metal, typically an aluminum alloy with magnesium and manganese.

Such valves are often used in very low-temperature applications, such as in the liquefication of helium or the rectification of air into hydrogen and oxygen. The purpose of the long connecting tube and valve stem is to hold the very cold parts as far as possible from the outer housing member, which typically has an operating handle or the like. The stem is typically tubular so that any leakage into the sleeve will form a vapor that will provide some thermal isolation.

In the known embodiments the end collar of the tube is formed with a flange forming part of the connector. A seal ring is engaged between this flange and the inner housing member and the collar and inner housing member are formed with complementary screwthreads to engage these two parts together and compress the seal ring. Such a connector comprised of screwthreads, a flange, and a seal ring is necessary because the collar is formed of a material that cannot readily be welded to the material of the inner member, even though a weld would be a much stronger and better connection. It is impossible to make a sufficiently strong tube and end collar of the same nonferrous metal needed for the inner member.

The problem with the complex seal-type connector is that with time the seal develops a leak. In particular the cold-temperature use means that this seal typically shrinks drastically and is generally subjected to enormous thermal stresses so its service life is fairly limited.

OBJECTS OF THE INVENTION

It is therefore an object of the present invention to provide an improved valve.

Another object is the provision of such an improved valve which overcomes the above-given disadvantages, that is which has a simplified connector between the end collar and the inner housing member.

SUMMARY OF THE INVENTION

A flow-control valve has according to the invention an outer housing assembly including an outer housing member, a tube fixed to the member and having an inner end remote from the member, and an end collar of high-alloy steel welded on the tube end. An inner housing member is formed of nonferrous metal with an inlet port and an outlet port and a valve seat between the ports. The end collar is seated in the inner housing member and a valve stem has an outer end at the outer housing member and an inner end projecting into the inner housing member and guided in the end collar, extending through the tube between the members, and carrying a valve body sealingly engageable with the seat. A connecting sleeve engaged around and fitted snugly to the end collar and inner member has an outer ring of high-alloy steel welded to the end collar and an inner ring of nonferrous metal, fixed integrally to the outer ring, and welded to the inner member.

According to the invention the connector therefore has two different parts that can be welded respectively to the ferrous end collar and the nonferrous inner member, producing a cheap, strong, and simple joint between these two elements. It is not normally possible to weld a nonferrous metal to a ferrous one by means of the standard manual procedures of arc welding, gas welding, or even autogenous welding. On the other hand according to the invention a friction weld integrally interconnects the rings. This friction weld is produced between rotation-symmetrical parts by orienting them coaxially and rotating one of them at high speed about their common axis relative to the other part while pressing the two parts together. Once the two parts have gotten quite hot, the relative rotation is stopped and they are just pushed axially together so that they bond integrally to each other. While such a procedure is virtually impossible to carry out on a complex machine part, it can easily be done in a shop on the two rings to produce a connector sleeve that can be welded to the two parts of noncompatible metals. The resultant joint is extremely strong and has a virtually unlimited service life.

In accordance with the invention the collar and inner member have interengaging complementary screwthreads and are formed with interengaging respective oppositely axially directed shoulders. Furthermore the collar is formed with an axially directed shoulder and the inner member has an annular end face axially bearing on the shoulder.

BRIEF DESCRIPTION OF THE DRAWING

The above and other objects, features, and advantages will become more readily apparent from the following description, reference being made to the accompanying drawing whose sole figure is an axial section through the valve according to the invention.

SPECIFIC DESCRIPTION

As seen in the drawing a valve has an outer housing member 1 formed mainly of high-alloy steel and a inner housing member 2 formed of a nonferrous alloy, here AlMg 4.5 Mn. A tube 3 is fixed to the outer housing member 1 to extend along an axis therefrom and has an outer end to which an end collar 7 is connected by a weld 19. The tube 3 and collar 7 are made of a high-alloy stainless steel, here 18/8 CrNi steel. The collar 7 has an external thread 13 that engages an internal thread 14 of a tubular extension 11 of the member 2 and an axially directed shoulder 15 of the collar 7 flatly engages an axially directed shoulder 16 of the extension 11.

A valve stem 4 that is tubular and concentric with the tube 3 extends down from the outer housing member 1 along the axis and has at its inner end a cylindrical fitting 9 guided inside a cylindrical internal surface 8 of the collar 7. This fitting 9 carries a valve body 5 that can engage in a seat 6 that separates an inlet port 2' form an outlet port 2" of the inner member 2.

According to the invention a connecting sleeve 10 engages snugly around the joint between the parts 7 and 2. This sleeve 10 comprises two integrally interconnected rings 10*a* and 10*b*. The outer ring 10*a* is made of the same material as the sleeve 3 and collar 7, that is 18/8 CrNi steel, and the inner ring is made of the same material as the member 2, that is AlMg 4.5 Mn and the parts are fixed together by a friction weld 20. The outer ring 10a has an axially directed shoulder 17 that flatly axially abuts an axially directed annular end face 18 of the tubular extension 11. A weld 12*a* secures the outer ring 10*a* to the collar 7 and a weld 12*b* secures the inner ring 10*b* to the member 2.

We claim:

1. A flow-control valve comprising:
    a valve housing assembly including
        an upper housing member,
        a tube of high-alloy steel fixed to the member and having an end remote from the member, and
        an end collar of high-alloy steel welded to the remote tube end;
    a lower housing member formed of nonferrous metal with an inlet port and an outlet port and a valve seat between the ports, the end collar having a lower portion seated in the lower housing member;
    a valve stem having an upper end at the upper housing member and a lower end projecting into the lower housing member and guided in the end collar, extending through the tube between the members and carrying a valve body sealingly engageable with the seat; and
    is a connecting sleeve engaged around and fitted snugly to a lower portion of the end collar and an upper portion of the lower member, the sleeve having
        an upper ring of high-alloy steel welded to a portion of the end collar,
        an lower ring of nonferrous metal welded to a portion of the lower member, and
        a friction weld integrally interconnecting the rings together.

2. The flow-control valve defined in claim 1 wherein the collar and lower member have interengaging complementary screwthreads and are formed with interengaging respective oppositely axially directed shoulders.

3. The flow-control valve defined in claim 1 wherein the collar is formed with an axially directed shoulder and the lower member has an annular end face axially bearing on the shoulder.

* * * * *